(12) United States Patent
Yang

(10) Patent No.: US 11,320,804 B2
(45) Date of Patent: May 3, 2022

(54) MULTI INFORMATION PROVIDER SYSTEM OF GUIDANCE ROBOT AND METHOD THEREOF

(71) Applicant: LG ELECTRONICS INC., Seoul (KR)

(72) Inventor: Hyunseok Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 230 days.

(21) Appl. No.: 16/490,005

(22) PCT Filed: Apr. 22, 2019

(86) PCT No.: PCT/KR2019/004817
§ 371 (c)(1),
(2) Date: Aug. 29, 2019

(87) PCT Pub. No.: WO2020/218630
PCT Pub. Date: Oct. 29, 2020

(65) Prior Publication Data
US 2020/0387139 A1    Dec. 10, 2020

(51) Int. Cl.
*G06F 16/9537* (2019.01)
*G05B 19/4155* (2006.01)
*G06F 16/22* (2019.01)
*G06F 16/25* (2019.01)
*G06F 21/31* (2013.01)
*G06F 3/14* (2006.01)

(52) U.S. Cl.
CPC ......... *G05B 19/4155* (2013.01); *G06F 16/22* (2019.01); *G06F 16/252* (2019.01);
(Continued)

(58) Field of Classification Search
CPC ...... G05B 19/4155; G05B 2219/32014; G05B 2219/40153; G06F 16/22; G06F 16/9537;
(Continued)

(56) References Cited

U.S. PATENT DOCUMENTS 10,926,413 B2 *   2/2021   Sutherland .............. H04L 65/60
10,997,014 B2 *   5/2021   Mishina .............. H04L 41/0893
(Continued)

FOREIGN PATENT DOCUMENTS

KR   10-2008-0090150 A   10/2008
KR   10-2010-0006975 A   1/2010
(Continued)

*Primary Examiner* — Jennifer N Welch
*Assistant Examiner* — K C Chen
(74) *Attorney, Agent, or Firm* — Birch, Stewart, Kolasch & Birch, LLP

(57) ABSTRACT

Provided is a multi-information provider system of a guidance robot and a method thereof. The multi-information provider system of a guidance robot may include a user database configured to receive and store user information transmitted from a terminal of a user, a robot database configured to receive pieces of robot information from one or more guidance robots and store the pieces of robot information, a valid robot list generator configured to list pieces of information of guidance robots located within a predetermined effective distance from a location of the user, a service matcher configured to match the user information and each of the pieces of robot information included in a valid robot list, and an outputter configured to output matched service information to the user terminal.

18 Claims, 11 Drawing Sheets

(52) U.S. Cl.
CPC .......... *G06F 16/9537* (2019.01); *G06F 21/31* (2013.01); *G05B 2219/32014* (2013.01); *G05B 2219/40153* (2013.01); *G06F 3/14* (2013.01)

(58) Field of Classification Search
CPC .......... G06F 16/252; G06F 21/31; G06F 3/14; G06F 3/1431; G06F 3/147; G05D 2201/0211; G05D 1/0297; G09G 2380/06; G09G 2370/022; G09G 2370/04; B25J 11/008; B25J 9/1679
See application file for complete search history.

(56) References Cited

U.S. PATENT DOCUMENTS

| | | | |
|---|---|---|---|
| 2011/0098874 A1* | 4/2011 | Choi | B25J 9/1664 701/26 |
| 2013/0066468 A1* | 3/2013 | Choi | B25J 11/008 700/258 |
| 2013/0204430 A1* | 8/2013 | Davey | G06F 17/00 700/216 |
| 2017/0285635 A1* | 10/2017 | Sisbot | G01C 21/3407 |
| 2017/0352200 A1* | 12/2017 | Wang | H04W 4/44 |
| 2017/0368691 A1* | 12/2017 | Li | G05D 1/0223 |
| 2018/0004202 A1* | 1/2018 | Onaga | G06Q 10/06315 |
| 2018/0245927 A1 | 8/2018 | Frish et al. | |
| 2019/0184567 A1* | 6/2019 | Hayashi | B25J 9/1664 |
| 2019/0311373 A1* | 10/2019 | Yoshida | G06K 9/00288 |
| 2021/0046650 A1* | 2/2021 | Deyle | B25J 9/1697 |

FOREIGN PATENT DOCUMENTS

| | | |
|---|---|---|
| KR | 10-2018-0024576 A | 3/2018 |
| KR | 10-2018-0039437 A | 4/2018 |
| KR | 10-2018-0040907 A | 4/2018 |

\* cited by examiner

[FIG. 1]
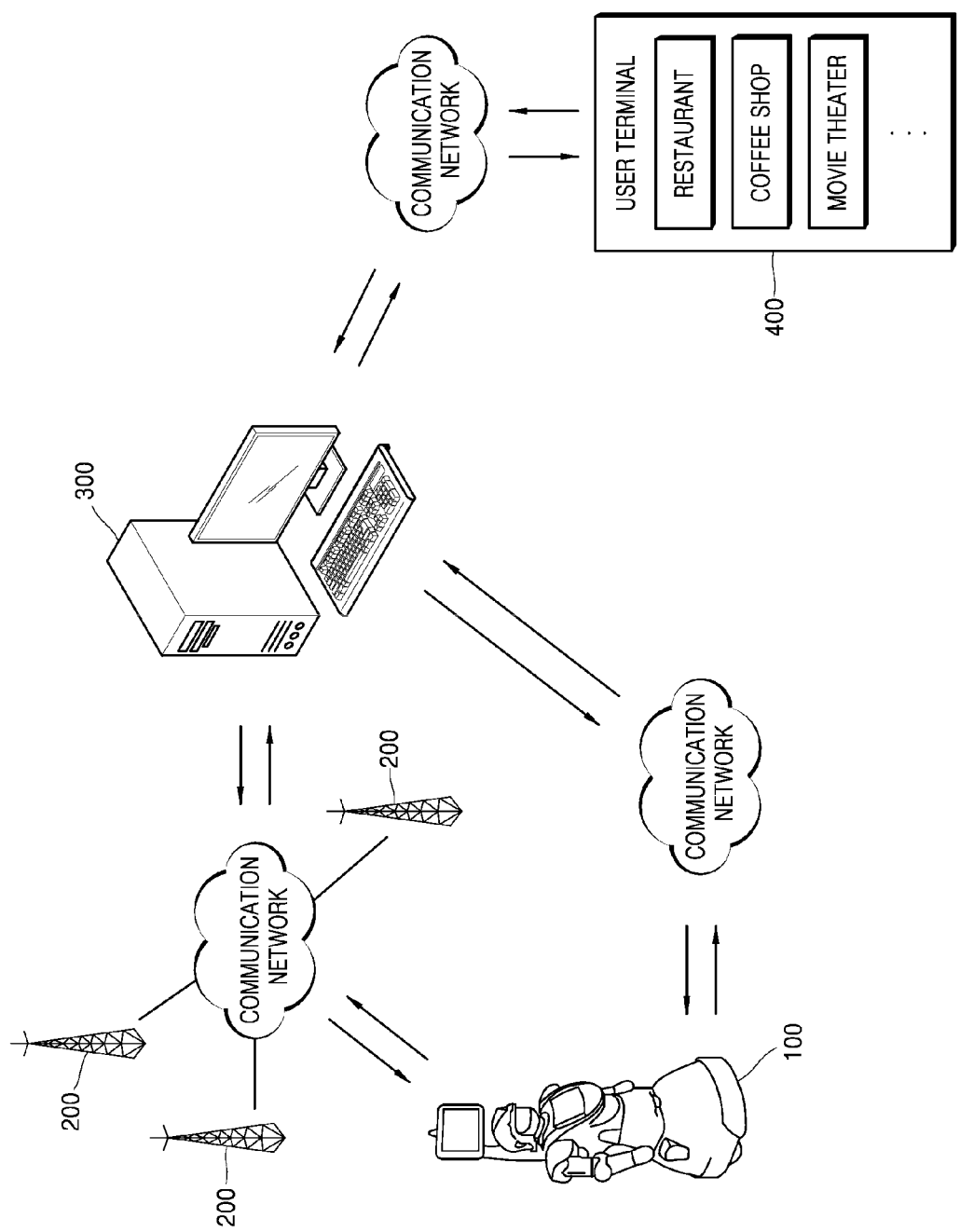

[FIG. 2]
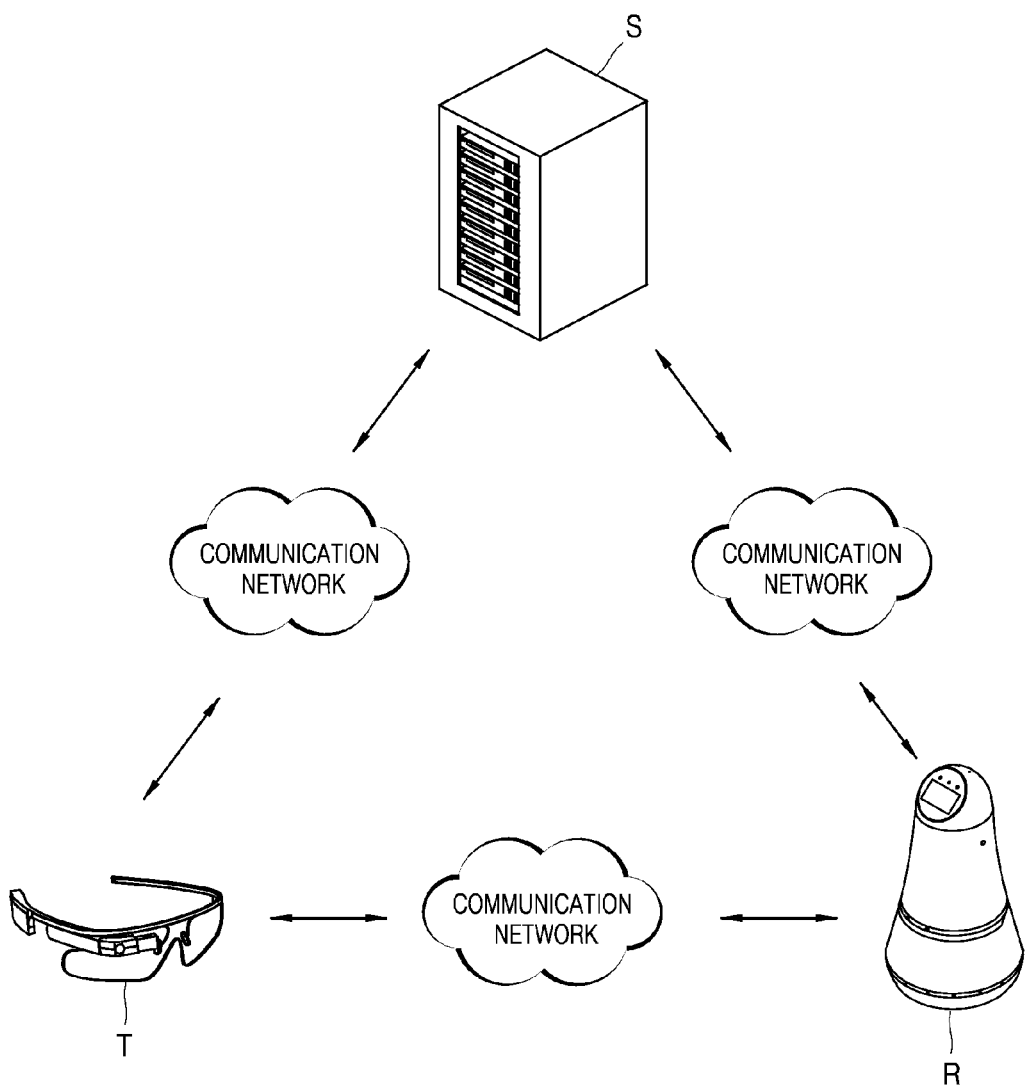

[FIG. 3]
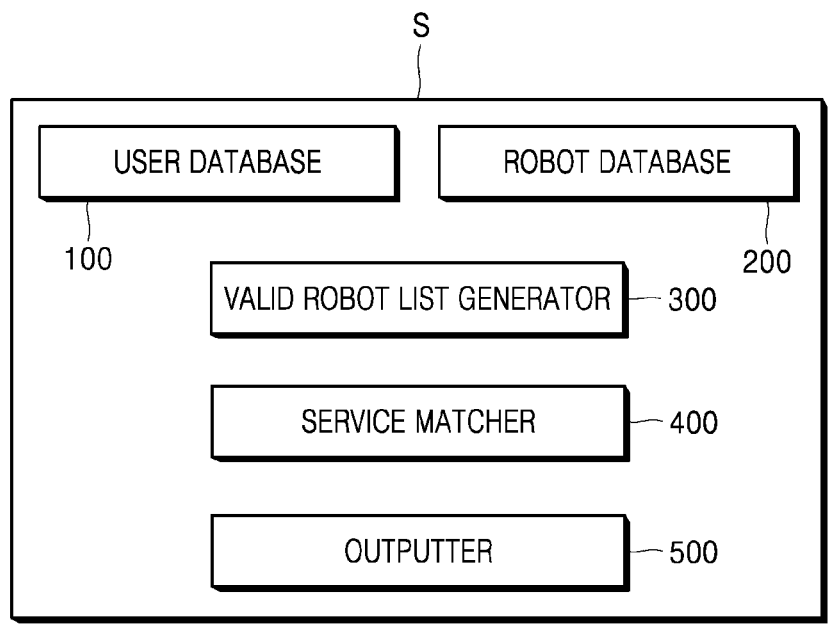

[FIG. 4]
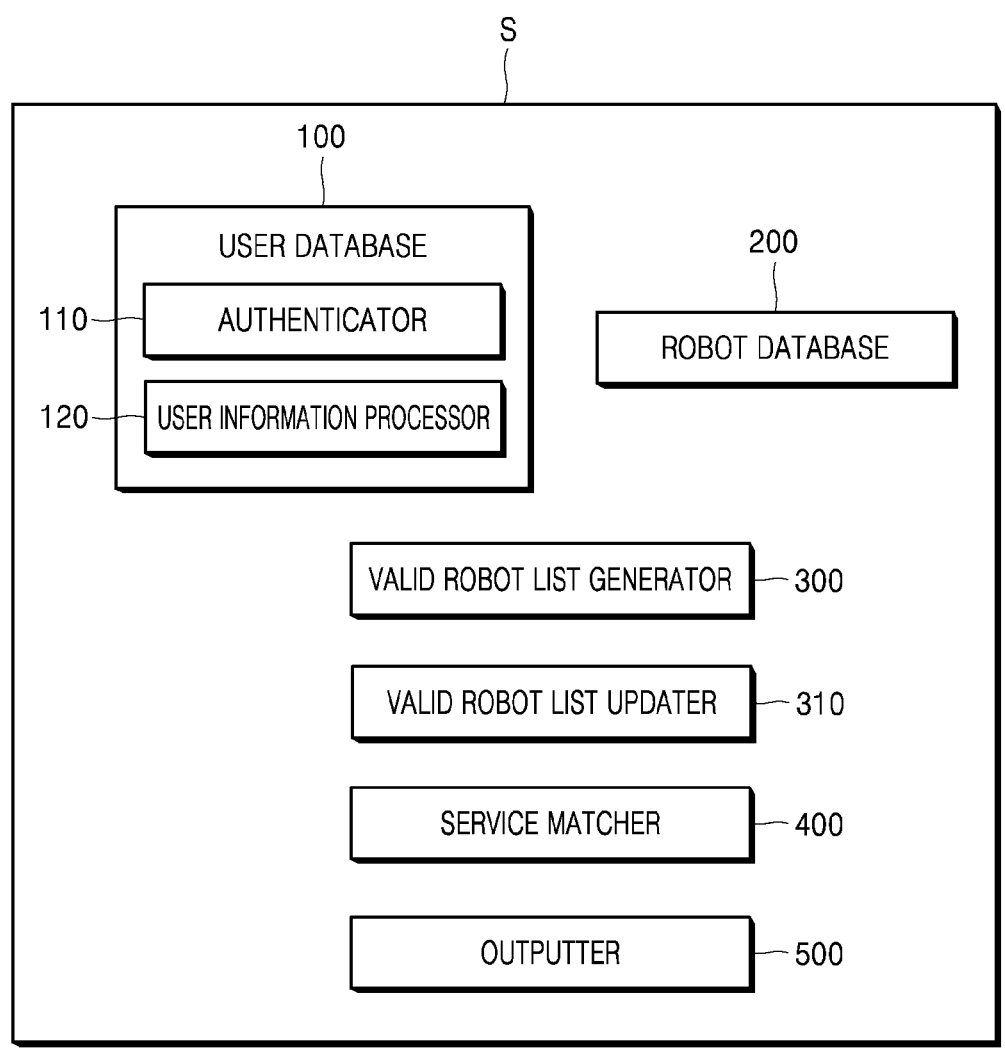

[FIG. 5]
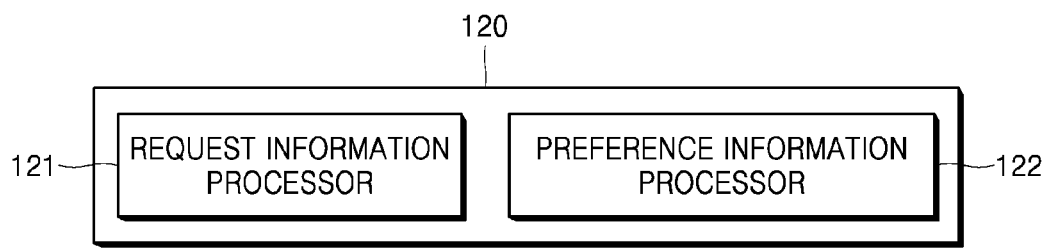

[FIG. 6]
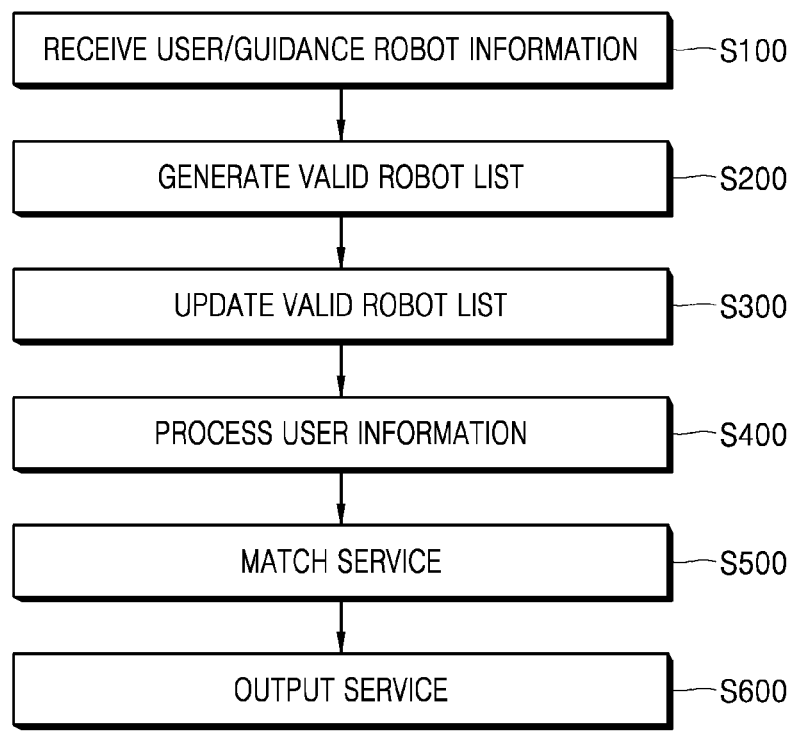

[FIG. 7]
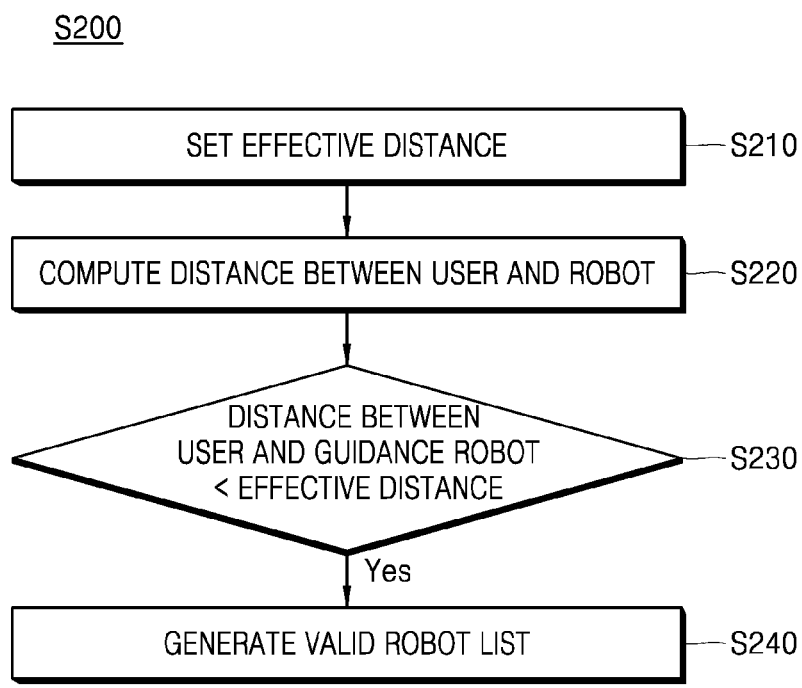

[FIG. 8]
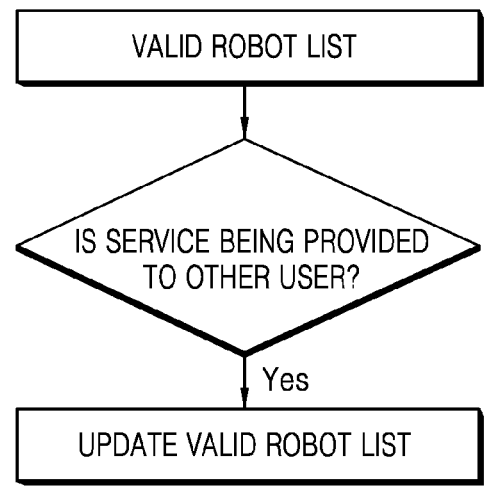

[FIG. 9]
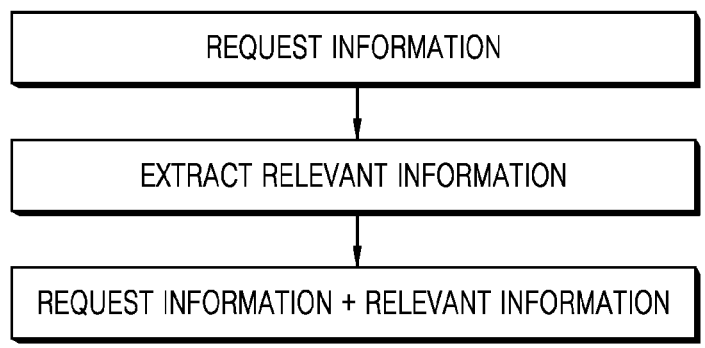

[FIG. 10]
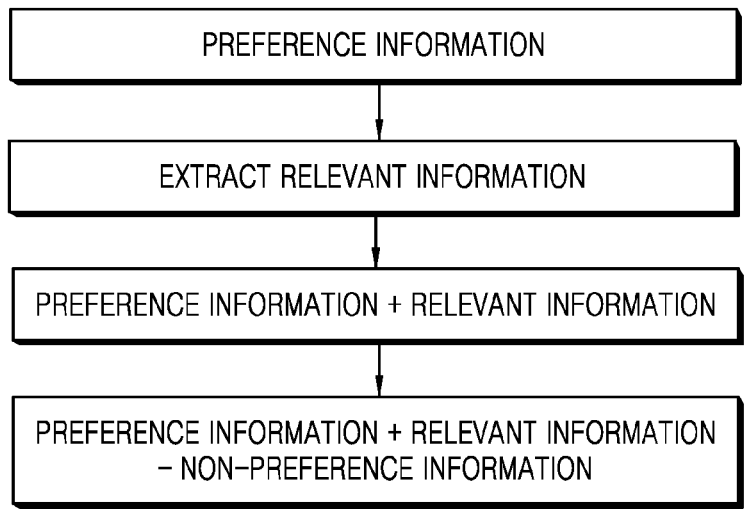

[FIG. 11]
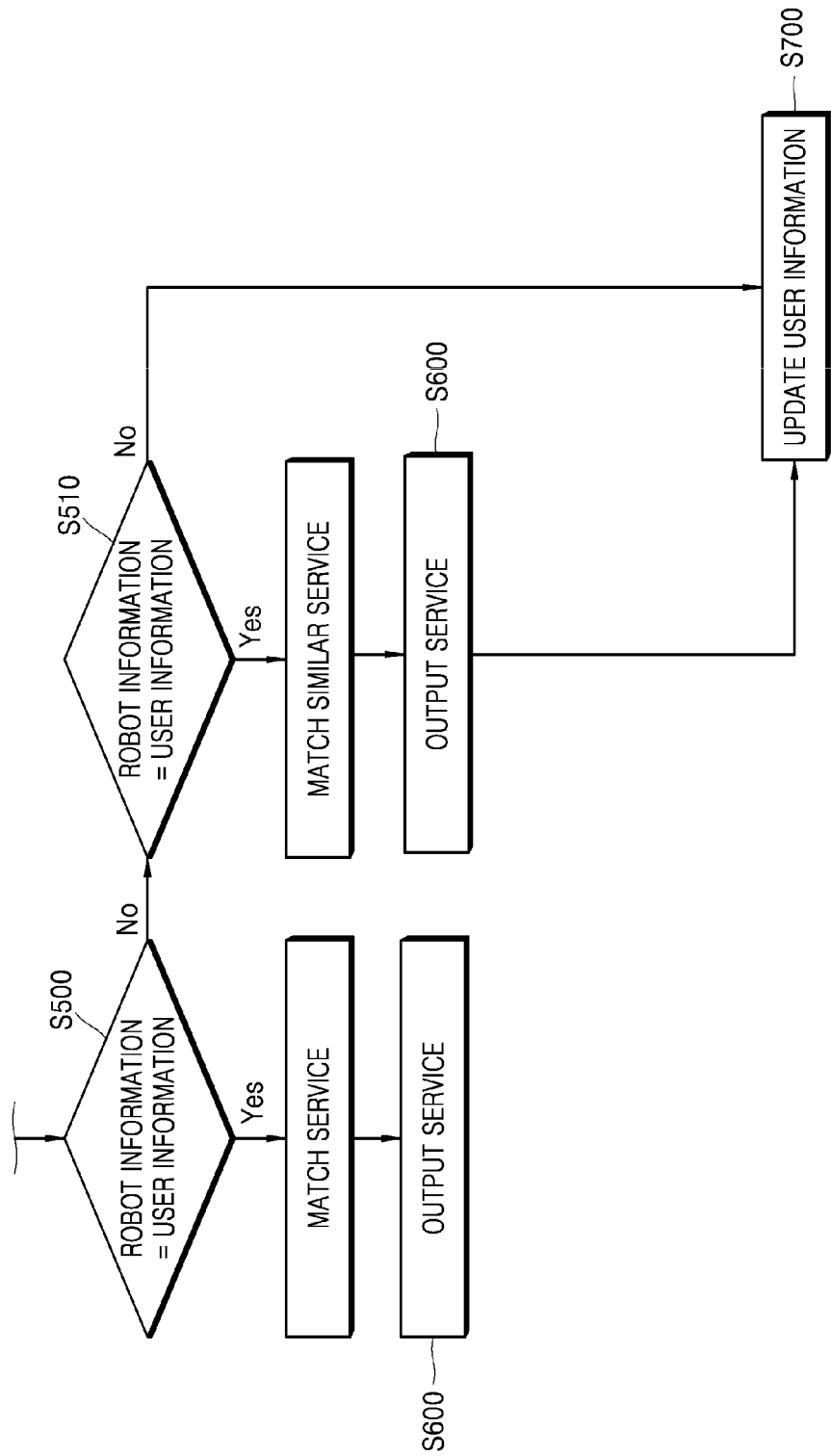

MULTI INFORMATION PROVIDER SYSTEM OF GUIDANCE ROBOT AND METHOD THEREOF

CROSS REFERENCE TO RELATED APPLICATIONS

This application is the National Phase of PCT International Application No. PCT/KR2019/004817, filed on Apr. 22, 2019, which is hereby expressly incorporated by reference into the present application.

TECHNICAL FIELD

The present invention relates to a multi-information provider system of a guidance robot and a method thereof.

BACKGROUND ART

Generally, guidance robots are installed in public places, such as airports, train stations, department stores, theaters, museums, or the like, to provide a variety of information, such as locations and facilities, to users.

Recently, guidance robots utilizing an autonomous driving technology have provided escort services to accompany users to destinations.

In this regard, prior-art document information is as follows:

1. Korean Laid-Open Patent Publication No. 10-2010-0006975 (published on Jan. 22, 2010)
Title of the invention: MOVING RECEPTIONIST ROBOT AND SYSTEM THEREOF The conventional moving reception robot, however, has the following problems.

As shown in FIG. 1, the conventional moving reception robot provides information and an escort service according to a user's service request input through a personal terminal.

However, the conventional moving reception robot has a drawback in that it cannot provide a service to another user while providing information and performing an escort service for one user.

To solve this problem, a plurality of moving reception robots may be operated to provide a service to more users, but even in this case, each moving reception robot provides information and performs an escort service for only one user, and thus the operation efficiency of the moving reception robot is lowered.

In addition, since the moving reception robot is relatively expensive, there is a problem in that economical efficiency is lowered when a plurality of moving reception robots are operated.

Also, when a plurality of moving reception robots provide a service in a limited space, there is a problem in that a traffic delay, a collision, and the like occur due to an increase in complexity.

Further, the user has to visually search for the reception robot in order to receive a service of the reception robot, and thus user accessibility is lowered.

DISCLOSURE

Technical Problem

An objective of the present invention is to solve the above-described problems and to prove a multi-information provider system of a guidance robot and a method thereof which allow a plurality of users to be simultaneously provided with services through one guidance robot.

In addition, another objective of the present invention is to provide a multi-information provider system of a guidance robot and a method thereof which provide services to a plurality of users requesting the same or similar services through a small number of guidance robots in a limited space, thereby reducing space complexity.

Also, another objective of the present invention is to provide a multi-information provider system of a guidance robot and a method thereof which guide a user to a nearby guidance robot on the basis of a location of the user, thereby improving user accessibility.

Technical Solution

According to one embodiment of the present invention to achieve the above-described objectives, a multi-information provider system of a guidance robot matches a user and a guidance robot that is currently providing a service which is the same or similar to a desired service of the user among guidance robots that are providing services to other users, thereby allowing a plurality of users to be provided with the service through one guidance robot.

More specifically, the multi-information provider system of a guidance robot according to one embodiment of the present invention may include a user database configured to receive and store user information transmitted from a terminal of a user, a robot database configured to receive pieces of robot information from one or more guidance robots and store the pieces of robot information, a valid robot list generator configured to list pieces of information of the guidance robots located within a predetermined effective distance from a location of the user, a service matcher configured to match the user information and each of the pieces of robot information included in a valid robot list, and an outputter configured to output matched service information to the user terminal.

The user terminal may include augmented reality (AR) glasses and the guidance robot may include a mobile robot equipped with an autonomous driving function.

The user information may include a location, a requested service, and preference and non-preference information and the robot information may include a location and information on a service currently provided.

The valid robot list generator may include a valid robot list updater configured to update the valid robot list by adding, to the valid robot list, service information of the guidance robot that is currently providing a service to another user from among the guidance robots included in the valid robot list.

In order to achieve the above-described objectives, the multi-information provider system of a guidance robot according to one embodiment of the present invention allows a plurality of users to be provided with services through one guidance robot by matching the user and the guidance robot currently providing a similar service even when a desired service of the user is not the same as information of the guidance robot currently providing the service to another user.

More specifically, the user database may include a user information processor configured to process the user information through relevant information corresponding to the user information.

The user information processor may include a request information processor configured to add corresponding relevant information to the user request information.

The user information processor may include a preference information processor configured to add corresponding relevant information to user preference information and then remove non-preference information.

Meanwhile, in order to achieve the above-described objectives, a multi-information provider method of a guidance robot according to one embodiment of the present invention allows a plurality of users to be provided with a service through one guidance robot by matching the user and the guidance robot currently providing the same service as a desired service of the user from among the guidance robots currently providing the service to other users.

More specifically, the multi-information provider method of a guidance robot according to one embodiment of the present invention may include receiving and storing user information of a user and pieces of robot information of guidance robots (R), generating a valid robot list in which the pieces of information of the guidance robots located within a predetermined effective distance from a location of the user are listed, updating the valid robot list in which information on a service currently provided by the guidance robot included in the valid robot list is updated to the valid robot list, generating processed user information in which the user information is processed through relevant information corresponding to the user information, matching a service by matching the user information and the robot information included in the updated valid robot list, and outputting the matched service.

The user information may include a location, a requested service, and preference and non-preference information and the robot information may include a location and information on a service currently provided.

The guidance robot may include a mobile robot equipped with an autonomous driving function.

In order to achieve the above-described objectives, the multi-information provider method of a guidance robot according to one embodiment of the present invention allows the user to be provided with a service of a guidance robot near the user so that user accessibility can be improved.

More specifically, the generating of the valid robot list may include setting an effective distance, computing a distance between the user and the guidance robot, comparing the set effective distance and the distance between the user and the guidance robot, and listing information of the guidance robot whose distance to the user is smaller than the effective distance.

The generating of the processed information may include processing request information in which relevant information corresponding to user request information is added to the user request information, and the generating of the processed information may include processing preference information in which relevant information corresponding to preference information of the user is added to the preference information and non-preference information is removed.

The matching of the service may include matching a similar service in which the processed user information is matched with the robot information included in the updated valid robot list.

In this case, the matching of the service may include matching a similar service when the user information is not the same as the robot information included in the updated valid robot list.

The multi-information providing method may further include, when the matching of the similar service is completed, updating the user information by including information generated in each operation.

Advantageous Effects

According to the present invention, a multi-information provider system of a guidance robot and a method thereof are characterized in that services are provided to a plurality of users through one guidance robot and hence operation efficiency of the guidance robot can be improved.

In addition, the multi-information provider system of a guidance robot and a method thereof according to the present invention have advantages in that the complexity in a limited space is significantly reduced, thereby preventing a traffic delay, a collision, and the like, and enabling pedestrians and guidance robots to travel smoothly.

Also, the multi-information provider system of a guidance robot and a method thereof according to the present invention have advantages in that a user is guided to a nearby guidance robot on the basis of a location of the user, thereby improving user accessibility.

Furthermore, the multi-information provider system of a guidance robot and a method thereof according to the present invention have advantages in that user's non-preference information is removed, thereby further improving the quality of provided service.

DESCRIPTION OF DRAWINGS

FIG. 1 is a diagram illustrating a configuration of a conventional mobile guidance robot system.

FIG. 2 is a diagram illustrating a configuration of a multi-information provider system of a robot according to one embodiment of the present invention.

FIG. 3 is a diagram illustrating a configuration of a multi-information provider system of a robot according to one embodiment of the present invention.

FIG. 4 is a diagram illustrating a detailed configuration of a multi-information provider system of a robot according to one embodiment of the present invention.

FIG. 5 is a diagram illustrating a configuration of a user information processor of a multi-information provider system of a guidance robot according to one embodiment of the present invention.

FIG. 6 is a flowchart illustrating a multi-information providing method of a guidance robot according to one embodiment of the present invention.

FIG. 7 is a flowchart illustrating an operation of generating a valid information list of a multi-information providing method of a guidance robot according to one embodiment of the present invention.

FIG. 8 is a flowchart illustrating an operation of updating the valid information list of the multi-information providing method of a guidance robot according to one embodiment of the present invention.

FIG. 9 is a flowchart illustrating an operation of processing request information of the multi-information providing method of a guidance robot according to one embodiment of the present invention.

FIG. 10 is a flowchart illustrating an operation of processing preference information of the multi-information providing method of a guidance robot according to one embodiment of the present invention.

FIG. 11 is a flowchart illustrating some operations of a service in the multi-information providing method of a guidance robot according to one embodiment of the present invention.

MODES OF THE INVENTION

Hereinafter, embodiments of the present invention will be described in detail with reference to the accompanying drawings. In the following description, like reference numerals designate like elements even when they are shown in different drawings. Further, in the following description of the present embodiments, a detailed description of known functions and configurations incorporated herein will be omitted for the purpose of clarity.

Additionally, in describing the components of the present invention, terms such as first, second, A, B, (a), and (b) may be used. These are solely for the purpose of differentiating one component from another and not to imply or suggest the substances, order or sequence of the components. If a component were to be described as "connected," "coupled," or "linked" to another component, it may mean not only that the components are directly "connected," "coupled," or "linked" but also that they are indirectly "connected," "coupled," or "linked" via a third component.

FIGS. 2 and 3 are diagrams illustrating, respectively, the entire configuration and a detailed configuration of a multi-information provider system of a robot according to one embodiment of the present invention.

Referring to FIGS. 2 and 3, the multi-information provider system of a guidance robot according to one embodiment of the present invention may include a user database 100 configured to receive and store user information transmitted from a user terminal T, a robot database 200 configured to receive pieces of robot information from one or more guidance robots R and store the pieces of robot information, a valid robot list generator 300 configured to list pieces of information of the guidance robots R located within a predetermined effective distance from a location of a user, a service matcher 400 configured to compare the user information with robot information in the valid robot list and match the user and a guidance robot R, and an outputter 500 configured to output the matching information to the user terminal T.

In this case, the user terminal T may include augmented reality (AR) glasses, a mobile device, a tablet device, and the like. In addition, the guidance robot R may include a mobile robot equipped with an autonomous driving function.

Even when the guidance robot R is fixed in a kiosk or the like, the multi-information provider system of a guidance robot according to one embodiment of the present invention is applicable because it is possible to continuously provide a service even to a user on the move through the AR glasses.

In this case, a more intuitive guidance service may be provided through a virtual mobile robot image output to the AR glasses.

In addition, the multi-information provider system of a guidance robot according to one embodiment of the present invention may be implemented as a server including a database and may transmit and receive information to and from each of the user terminal T and the guidance robot R through a communication network.

The user information may include a location, a requested service, preference and non-preference information, and the like. In addition, the user database 100 may further include a user authenticator 110 configured to determine a user's access right.

Also, the robot information may include a location, whether or not a service is being provided, information on a service currently provided, and the like.

For example, when the multi-information provider system of a guidance robot according to one embodiment of the present invention is applied to an airport, sequences [S1 to S3] are as follow.

[S1] A user wearing AR glasses enters an airport and intends to go to a boarding terminal. Accordingly, when the user requests a route guidance service to reach the boarding terminal through a user interface of the AR glasses, the user's location information and requested service information are stored in the user database 100.

[S2] The valid robot list generator 300 lists information on guidance robots R located within a predetermined effective distance from the user from among guidance robots R whose robot information is stored in the robot database 200.

[S3-1] When the guidance robot R included in the valid robot list is not currently providing a service to another user, the service matcher 400 matches the user and the corresponding guidance robot R. Then, the matching service information is output to the AR glasses.

[S3-2] When the guidance robot R included in the valid robot list is currently providing a service to another user, the service matcher 400 matches the route guidance service requested by the user and the service information of the service currently provided by the guidance robot R, and when the services are the same, matches the user and the corresponding guidance robot R. Then, the matching service information is output to the AR glasses.

Accordingly, the guidance robot R is able to provide the service to the user while providing the service to another user so that operation efficiency of the guidance robot R can be improved.

In addition, the user is matched with the guidance robot R at a short distance from the current position, and hence user accessibility can be improved.

Also, the outputter 500 may output travel paths of all the guidance robots R included in the valid robot list through the AR glasses and may output information on facilities, stores, and the like on the travel path.

FIG. 4 is a diagram illustrating a detailed configuration of the multi-information provider system of a robot according to one embodiment of the present invention.

The detailed configuration of a multi-information provider system of the robot according to one embodiment of the present invention will be described below with reference to FIG. 4.

The valid robot list generator 300 may further include a valid robot list updater 310 configured to generate a valid robot list through pieces of location information of guidance robots R located within a predetermined effective distance from a location of the user and update the valid robot list by adding, to the valid robot list, service information of the guidance robots R currently providing a service to other users among the guidance robots R included in the valid robot list.

Since the valid robot list updater 310 updates only the currently provided service information of the guidance robots R included in the valid robot list after the valid robot list is generated in the valid robot list generator 300 on the basis of the location information, it is possible to reduce a load of the valid robot list generator 300.

In addition, the user database 100 may include a user information processor 120 configured to process user information through relevant information corresponding to the user information.

More specifically, the user information processor 120 may process the user information through a requested service, preference and non-preference information, and the like which are stored in the user database 100.

FIG. 5 is a diagram illustrating a configuration of a user information processor of a multi-information provider system of a guidance robot according to one embodiment of the present invention.

A detailed configuration of the user information processor 120 including a request information processor 121 and a preference information processor 122 will be described below with reference to FIG. 5.

The request information processor 121 processes user request information by adding corresponding relevant information to the user request information.

For example, as described in operation [S1], when the user requests a route guidance service to go to a boarding terminal, the request information processor 121 may add relevant information, such as a flight schedule of the corresponding boarding terminal, nearby facilities, stores, and the like, to route information of the corresponding boarding terminal.

Accordingly, the service matcher 400 may match the user information and a guidance robot R which is currently providing a service that is not even the same as the route guidance service requested by the user, according to the degree of relevance of each of the pieces of information.

Hence, the user and a guidance robot R that is currently providing another user with a route guidance service for a toilet near the boarding terminal may be matched through the request information processor 121.

Accordingly, since the multi-information provider system of a guidance robot according to one embodiment of the present invention may match the user and the guidance robot R according to the degree of relevance even when the user request information and the service information of the robot are not the same, it is possible to further improve the operation efficiency of the guidance robot R.

In addition, the multi-information provider system of a guidance robot according to one embodiment of the present invention has advantages in that the complexity in a limited space is significantly reduced, thereby preventing a traffic delay, a collision, and the like, and enabling pedestrians and the guidance robots to travel smoothly.

The preference information processor 122 adds corresponding relevant information to the user preference information and then removes user non-preference information.

For example, as described in operation [S3-2], the user requests information on stores located on the travel route while the user is being provided with the route guidance service to go to the boarding terminal by the guidance robot R. In this case, the preference information processor 122 removes non-preference information from store information and relevant information while leaving the preference information.

Accordingly, a service that the user does not prefer is not matched through the preference information processor 122, and thus it is possible to further improve the quality of provided service.

In addition, the user database 100 may accumulatively store information of the user, and when the user is authenticated through the authenticator 110, allow pre-stored user information to be retrieved.

Thus, as the access to the multi-information provider system of a guidance robot according to one embodiment of the present invention is repeated, the user information including the user's preference and non-preference information becomes more concrete, so that the user can be provided with better quality service.

FIG. 6 is a flowchart illustrating a multi-information providing method of a guidance robot according to one embodiment of the present invention.

Referring to FIG. 6, the multi-information providing method of a guidance robot according to one embodiment of the present invention may include receiving information (S100) in which information of a user and each of the pieces of information of guidance robots R is received and stored, generating a valid robot list (S200) in which the pieces of information of guidance robots located within a predetermined effective distance from a location of the user are listed, updating the valid robot list (S300) in which information on a service currently provided by a guidance robot R included in the valid robot list is updated to the valid robot list, and generating processed user information (S400) in which the user information is processed through relevant information corresponding to the user information, matching a service (S500) by matching the user information and the robot information included in the updated valid robot list, and outputting the matched service (S600).

As long as the generating of the processed user information (S400) is performed after the receiving of the information (S100) and before the matching of the service (S500), operation S400 may be performed regardless of order and may be omitted under some circumstances.

The user information may include a location, a requested service, and preference and non-preference information. In addition, a unit to be used to transmit the user information may preferably be a user terminal T including AR glasses.

In addition, the robot information may include a location and information on a service currently provided, and the guidance robot R may include a mobile robot equipped with an autonomous driving function.

FIG. 7 is a flowchart illustrating an operation of generating a valid information list of a multi-information providing method of a guidance robot according to one embodiment of the present invention.

FIG. 8 is a flowchart illustrating an operation of updating the valid information list of the multi-information providing method of a guidance robot according to one embodiment of the present invention.

Referring to FIGS. 7 and 8, the generating of the valid robot list (S200) may include a setting an effective distance (S210), computing a distance between the user and the guidance robot R (S220), comparing the set effective distance and the distance between the user and the guidance robot (S230), and listing pieces of information of the guidance robots R whose distance to the user is smaller than the effective distance (S240).

In this case, the robot information to be listed may include a location and information on a service currently provided.

According to the multi-information providing method of a guidance robot according to one embodiment of the present invention, the user may be matched with a nearby guidance robot R so that the user accessibility is improved.

FIGS. 9 and 10 are flowcharts illustrating, respectively, operations of processing request information and processing preference information of the multi-information providing method of a guidance robot according to one embodiment of the present invention.

Referring to FIGS. 9 and 10, the generating of the processed information may include processing request information (S410) in which relevant information corresponding to user request information is added to the user request information.

In addition, the generating of the processed information (S400) may further include processing preference information (S420) in which relevant information corresponding to the user's preference information is added to the user's preference information and non-preference information is removed.

According to the multi-information providing method of a guidance robot according to one embodiment of the present invention, the service is provided to the user by removing the non-preference information so that the quality of service provided by the robot can be improved.

FIG. 11 is a flowchart illustrating some operations of a service in the multi-information providing method of a guidance robot according to one embodiment of the present invention.

Referring to FIG. 11, the matching of the service (S500) may include matching a similar service (S510) in which the processed user information is matched with the robot information included in the updated valid robot list.

In this case, when the user information is not the same as the robot information in the updated valid robot list, it is preferable to perform the matching of the similar service (S510).

When the matching of the similar service (S510) is complete, updating the user information (S700) by including information generated in each operation may be further included.

According to the multi-information providing method of a guidance robot according to one embodiment of the present invention, even when the user's request information is not the same as the robot information of the guidance robot R that is currently providing a service to another user, the user may be matched with the guidance robot according to the degree of similarity of each of the pieces of information so that the operating efficiency of the guidance robot R can be further improved.

In addition, when matching between the user and the guidance robot R fails, the user information is updated, so that the user can be provided with the service of the guidance robot R within a short period of time.

Also, even when the request information and the service information are not the same, the user information is updated, so that the user can be matched with another guidance robot R within a short period of time and be provided with a service.

The invention claimed is:

1. A multi-information provider system of a guidance robot, the multi-information provider system comprising:
    a user database;
    a robot database: and
    a processor configured to:
        receive user information including a location of a user from a terminal of the user,
        store the user information to the user database,
        receive pieces of robot information from guidance robots, and
        store the pieces of robot information to the robot database,
    wherein the processor is further configured to:
        control a valid robot list generator to identify at least one guidance robot boated within a predetermined effective distance from the location of the user among the guidance robots, wherein the valid robot list generator includes a valid robot list updater configured to update the valid robot list by adding, to the valid robot list, service information of the guidance robot that is currently providing a service to another user from among the guidance robots included in the valid robot;
        control a service matcher to match the user information and the pieces of robot information of the identified at least one guidance robot;
        control an outputter to output matched service information to the terminal; and
        generate a valid robot list, and
    wherein the processor is further configured to:
        set an effective distance,
        compare the set effective distance and the distance between the user and the guidance robot, and
        list information of the guidance robot whose distance to the user is smaller than the effective distance.

2. The multi-information provider system of claim 1, wherein the user terminal includes augmented reality (AR) glasses.

3. The multi-information provider system of claim 1, wherein the guidance robot includes a mobile robot equipped with an autonomous driving function.

4. The multi-information provider system of claim 1, wherein the user information includes a requested service, and preference and non-preference information.

5. The multi-information provider system of claim 1, wherein the robot information includes a location and information on a service currently provided.

6. The multi-information provider system of claim 1, wherein the user database includes a user authenticator configured to determine an access right of the user.

7. The multi-information provider system of claim 1, wherein the user database includes a user information processor configured to process the user information through relevant information corresponding to the user information.

8. The multi-information provider system of claim 7, wherein the user information processor includes a request information processor configured to add corresponding relevant information to the user request information.

9. The multi-information provider system of claim 7, wherein the user information processor includes a preference information processor configured to add corresponding relevant information to user preference information and then remove non-preference information.

10. A multi-information providing method of a guidance robot, the multi-information providing method comprising:
    receiving user information including a location of a user from a terminal of the user and storing the received user information;
    receiving pieces of robot information from guidance robots and storing the received pieces of robot information;
    identifying at least one guidance robot located within a predetermined effective distance from the location of the user among the guidance robots;
    matching the user information and the pieces of robot information of the identified at least one guidance robot;
    outputting matched service information to the terminal;
wherein the generating the valid robot list comprises:
    setting an effective distance;
    comparing the set effective distance and the distance between the user and the guidance robot; and
    listing information of the guidance robot whose distance to the user is smaller than the effective distance; and
    updating the valid robot list by adding, to the valid robot list, service information of the guidance robot that is currently providing a service to another user from among the guidance robots included in the valid robot list.

11. The multi-information providing method of claim 10, wherein the user information includes a location, a requested service, and preference and non-preference information.

12. The multi-information providing method of claim 10, wherein the robot information includes a location and information on a service currently provided.

13. The multi-information providing method of claim 10, wherein the guidance robot includes a mobile robot equipped with an autonomous driving function.

14. The multi-information providing method of claim 10, further comprising generating processed information,
   wherein the generating the processed information comprises processing request information in which relevant information corresponding to user request information is added to the user request information.

15. The multi-information providing method of claim 10, further comprising generating processed information,
   wherein the generating the processed information comprises processing preference information in which relevant information corresponding to preference information of the user is added to the preference information and non-preference information is removed.

16. The multi-information providing method of claim 10, further comprising matching a service by matching a similar service in which the user information is matched with the pieces of robot information included in an updated valid robot list.

17. The multi-information providing method of claim 16, wherein the matching the service comprises matching a similar service when the user information is not the same as the pieces of robot information included in the updated valid robot list.

18. The multi-information providing method of claim 16, further comprising, when the matching of the similar service is completed, updating the user information by including information generated in each operation.

* * * * *